United States Patent
Song (10) Patent No.: US 10,027,767 B2
(45) Date of Patent: Jul. 17, 2018

(54) METHOD FOR PROVIDING SNS-BASED FILE AGING SERVICE

(71) Applicant: Myung Bean Song, Goyang (KR)

(72) Inventor: Myung Bean Song, Goyang (KR)

(*) Notice: Subject to any disclaimer, the term of this patent is extended or adjusted under 35 U.S.C. 154(b) by 266 days.

(21) Appl. No.: 14/835,429

(22) Filed: Aug. 25, 2015

(65) Prior Publication Data
US 2017/0064010 A1   Mar. 2, 2017

(51) Int. Cl.
*G06F 15/16* (2006.01)
*H04L 29/08* (2006.01)
*H04L 12/58* (2006.01)

(52) U.S. Cl.
CPC ............. *H04L 67/16* (2013.01); *H04L 51/32* (2013.01); *H04L 67/10* (2013.01); *H04L 67/28* (2013.01); *H04L 67/306* (2013.01)

(58) Field of Classification Search
CPC ................................ H04L 67/28; H04L 51/32
See application file for complete search history.

(56) References Cited

U.S. PATENT DOCUMENTS

2013/0191927 A1*   7/2013   Miura .................. G06Q 10/101
                                                            726/26

FOREIGN PATENT DOCUMENTS

KR          10-1158336          6/2012

* cited by examiner

*Primary Examiner* — Nam T Tran
(74) *Attorney, Agent, or Firm* — Ladas & Parry, LLP (57) ABSTRACT

An embodiment of the present invention provides a method for providing an SNS-based file aging service executed in a SNS-based file aging service providing server, and the method includes receiving a SNS registration event for at least one user of at least one user, checking whether a content upload event is being occurred on a SNS of the at least one user at which the SNS registration event is received, mapping the content at which the content upload event is occurred with the SNS registration event of the at least one user for the storage thereof, and expiring the content uploaded on the SNS, the content being stored by mapping it with the SNS registration event, when an SNS deregistration event is being occurred for the at least one user from the at least one user.

19 Claims, 11 Drawing Sheets

RECOGNIZE AND SAVE FACES OF A AND B

METHOD FOR PROVIDING SNS-BASED FILE AGING SERVICE

FIELD OF THE INVENTION

The present invention relates to a method for providing SNS-based file aging service, and more particularly, to a method for aging processing a content of a user uploaded on SNS according to a change of human relationship on SNS.

BACKGROUND OF THE INVENTION

Recently, as an importance of security is getting higher, a variety of security programs are used, and a variety of security programs are also being developed. In addition, in case of sharing personal information or copyrighted works, a risk of information leakage is increased; thus, an importance of security programs is continually being increased.

One of methods for managing a file is done by managing an access to database. In relation to the method for managing the file, Korean registered Patent No. 10-1158336 (published on Jun. 22, 2012) discloses a method that is able to handle a copy, move, inquiry and delete of personal information solely according to an authorization assigned to each virtual directory.

Merely, in providing a service for managing a file, when it is not able for a user to delete a re-distributed content linked on SNS, and it is not able for a user to be directly deleted by the user him/herself according to a change of human relationship on SNS even though the content has been uploaded by the user him/herself, the user directly involved cannot delete it in spite of his/her desire. Moreover, unless file itself is deleted, if a database is hacked, the relevant file may be leaked, and when a copyrighted file is shared, in a digital environment that copy and save is easy, it cannot exclude a possibility that the file may be re-distributed by a user who has not copyright to the relevant file.

SUMMARY OF THE INVENTION

In view of the above the present invention provides a method for providing a file aging service that a user directly concerned may directly manage content posted a notice or uploaded by the user him/herself even though inaccessible situation is occurred due to deletion of content or blocking an access to content by enabling an aging or de-aging process of content uploaded by the user him/herself even though human relationship is changed on an SNS. However, the technical solutions in accordance with an embodiment of the present invention are not limited to the forgoing technical problem, but there might be another technical problem.

An embodiment of the present invention provides a method for providing an SNS-based file aging service executed in a SNS-based file aging service providing server, and the method includes receiving a SNS registration event for at least one user of at least one user, checking whether a content upload event is being occurred on a SNS of the at least one user at which the SNS registration event is received, mapping the content at which the content upload event is occurred with the SNS registration event of the at least one user for the storage thereof, and expiring the content uploaded on the SNS, the content being stored by mapping it with the SNS registration event, when an SNS deregistration event is being occurred for the at least one user from the at least one user.

In accordance with any one solution of the above described present invention, the user directly involved may directly manage content uploaded by the user him/herself even though human relationship is changed on SNS, or may manage content by automatically processing content of other user against content of the user directly involved to be aged in case of blocking an access to the content or deleting the content or of being blocked an access to content or being deleted, therefore, it is possible to prevent a copyrighted work from being redistributed or re-shared.

DETAILED DESCRIPTION OF THE EMBODIMENTS

Hereinafter, embodiments of the present invention will be described in detail with reference to the accompanying drawings so that those skilled in the art can readily implement them. However, the present invention may be implemented in different forms, but it is not limited thereto. In the drawings, further, portions unrelated to the description of the present invention will be omitted for clarity of the description, and like reference numerals and like components refer to like elements throughout the detailed description.

In the entire specification, when a portion is "connected" to another portion, it means that the portions are not only "connected directly" with each other but they are electrically connected" with each other by way of another device therebetween. Further, when a portion "comprises" a component, it means that the portion does not exclude another component but further comprises other component unless otherwise described. Furthermore, it should be understood that one or more other features or numerals, steps, operations, components, parts or their combinations can be or are not excluded beforehand.

Hereinafter, the embodiments of the present invention will be described in detail with reference to the accompanying drawings.

Figure 1:
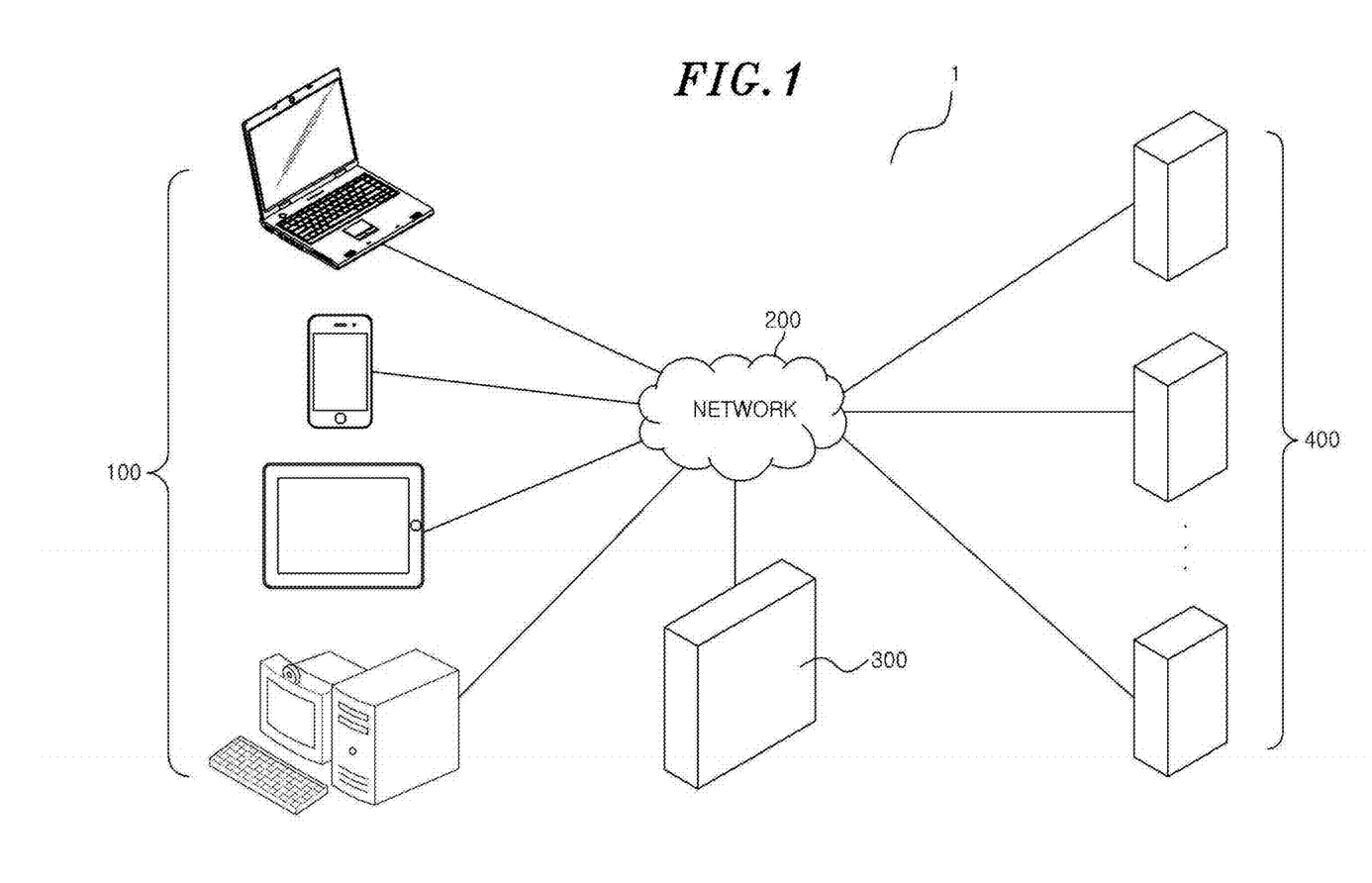
FIG. 1 is a diagram of a configuration for explaining a system of providing an SNS-based file aging service in accordance with an embodiment of the present invention.

FIG. 1 is a diagram of a configuration for explaining a system of providing an SNS-based file aging service in accordance with an embodiment of the present invention. Referring to FIG. 1, a system for providing an SNS-based file aging service providing 1 may include at least one user terminal 100, a SNS-based file aging service provider 300, and at least one SNS server 400. It is noted that the system for providing an SNS-based file aging service 1 of FIG. 1 is only an embodiment, and the present invention is not construed to be limited to the embodiment in FIG. 1. Each of components in FIG. 1 is generally connected through a network 200. For example, as shown in FIG. 1, at least one user terminal 100 and the file aging service providing server 300 may be connected through the network 200. Further, the file aging service providing server 300 may be connected to at least one SNS server 400 through the network 200. At least one user terminal 100 may be connected to at least one SNS server 400 via the file aging service providing server 300.

As used herein, the network 200 means a connection structure capable of exchanging information between nodes such as terminals and servers. As an example, the network 200 may include, but is not limited to, the Internet, LAN (Local Area Network), Wireless LAN (Wireless Local Area Network), WAN (Wide Area Network), PAN (Personal Area Network), 3G, 4G, LTE, Wi-Fi, etc. Herein, at least one user terminal 100, the file aging service providing server 300, at least one SNS server 400 disclosed in FIG. 1 is not limited to those shown in FIG. 1.

At least one user terminal 100 may be a terminal uploading or transmitting to at least one SNS server 400. Furthermore, at least one user terminal 100 may be a terminal that identifies at the time of extinction of content uploaded via the file aging service providing server 300, or deletes the uploaded content, or increases or decreases the time of extinction of content, or again recovers the content. At least one user terminal 100 may be embodied with a terminal connectable to a remote server or terminal through the network 200. At least one user terminal 100 may be embodied with a computer connectable to a remote server or terminal through the network 200. As used herein, the computer, for example, may include a notebook equipped with a camera, a desktop, a laptop, and so on. Further, at least one user terminal 100 may be embodied with a terminal connectable to a remote server or terminal through the network 200. At least one user terminal 100, for example, is a wireless communication device that the portability and the mobility are guaranteed, and may include all kinds of handheld-based wireless communication device such as PCS (Personal Communication System), GSM (Global System for Mobile communications), PDC (Personal Digital Cellular), PHS (Personal Handy phone System), PDA (Personal Digital Assistant), IMT (International Mobile Telecommunication)-2000, CDMA (Code Division Multiple Access)-2000, W-CDMA (W-Code Division Multiple Access), WIBRO (Wireless Broadband Internet) terminal, smartphone, Smartpad, Tablet PC, and so on.

The file aging service providing server 300 may be a server that receives a content uploading event from at least one user terminal 100 via at least one SNS server 400, and maps the time of extinction of content included in the received content uploading event with at least one user terminal 100 to store it. Accordingly, the file aging service providing server 300 may map and store the content uploaded in at the least one user terminal 100 and website, application, messenger, cloud, PC, and/or mail server at which the uploaded content may be located. And then, the file aging service providing server 300 may transmit an extinction scheduling message of content to at least one user terminal 100 when the content extinction time is approaching. In response, when an extinction curing message is transmitted from at least one user terminal 100 as a response message, a de-aging signal of content is outputted from the file aging service providing server 300, and when the response message is a content extinction identifying message, an extinction signal of content may be transmitted to at least one site or at least one SNS server 400 to delete the content. Accordingly, the file aging service providing server 300 may enable a user of at least one user terminal 100 to identify in one site whether what kinds of content is stored in which site or terminal. Further, the file aging service providing server 300 may enable the user of at least one user terminal 100 to set the life of content, and may reduce junk data of the server of a website and protect a copyrighted work of the person by identifying whether the expired content should be deleted or not. The file aging service providing server 300 may be embodied with a computer connectable to a remote server or terminal through the network 200. As used herein, the computer, for example, may include a notebook equipped with a camera, a desktop, and a laptop, and so on.

At least one SNS server 400 may be a social network service providing server. At least one SNS server 400 may be a server capable of uploading or storing content from at least one user terminal 100 that access thereto. At least one SNS server 400 may receive a de-aging signal or content extinction signal from the file aging service providing server. For example, at least one SNS server 400 allows the content not to be expired in case of receiving the de-aging signal, and allows the content to be deleted in case of receiving the content extinction signal. In this case, at least one SNS server 400 may be embodied with a terminal connectable to a remote server or terminal through the network 200. At least one SNS server 400 may be embodied with a computer connectable to a remote server or terminal through the network 200. Further, at least one SNS server 400 may be with a terminal connectable to a remote server or terminal through the network 200.

Figure 2:
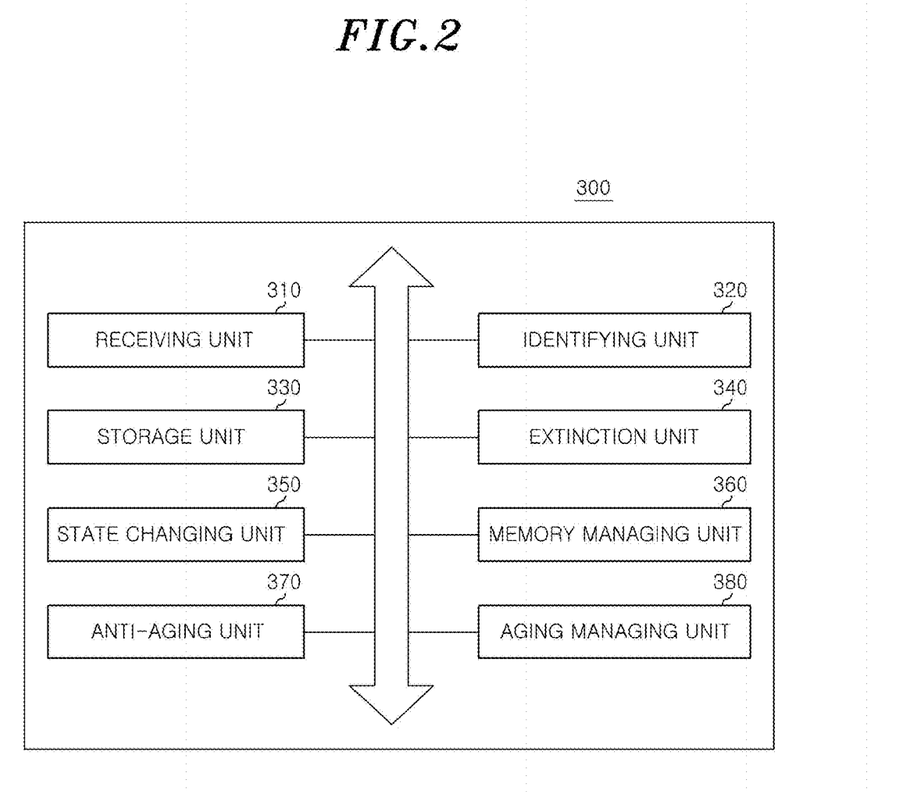
FIG. 2 is a diagram illustrating a configuration for a SNS-based file aging service providing server shown in FIG. 1.
Figure 3A:
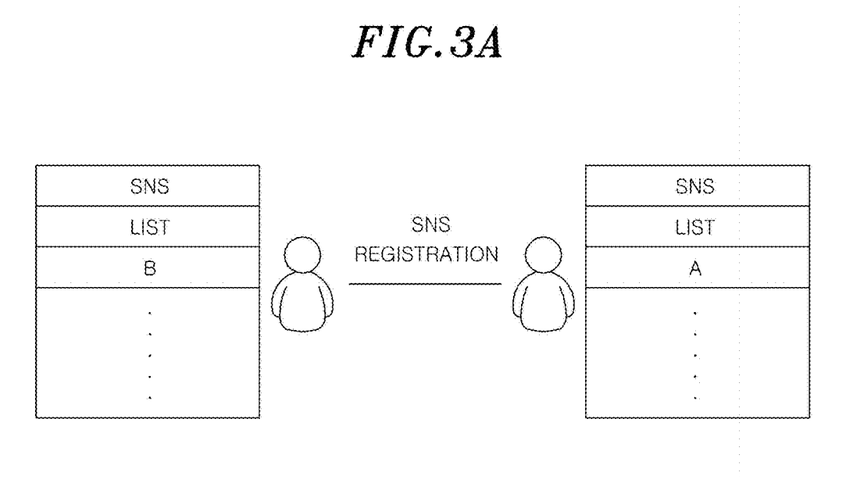
FIGS. 3A-3D are diagrams showing an embodiment in which an SNS-based file aging service illustrated in FIG. 1 is embodied on SNS.
Figure 3B:
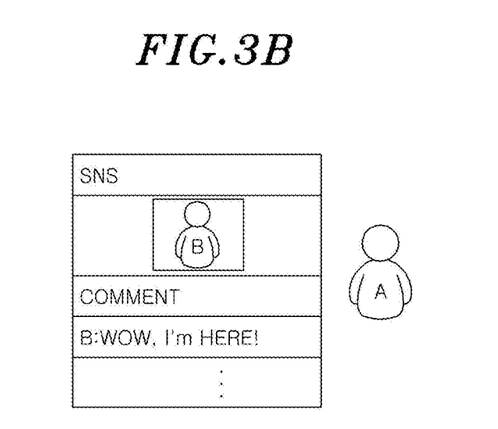
Figure 3C:
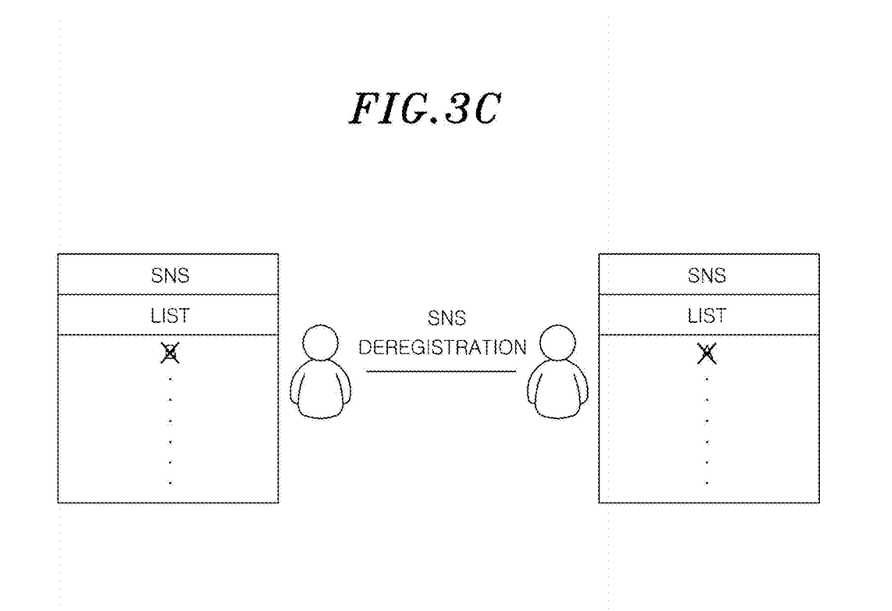
Figure 3D:
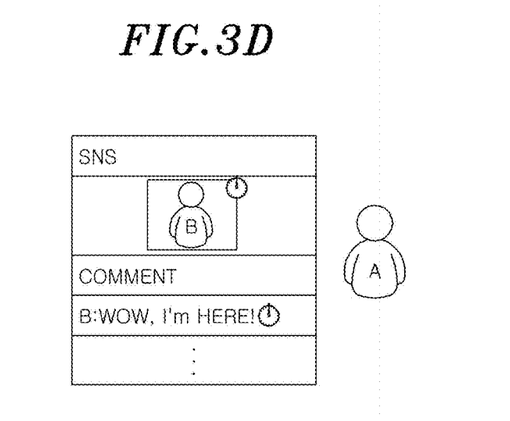
Figure 4A:
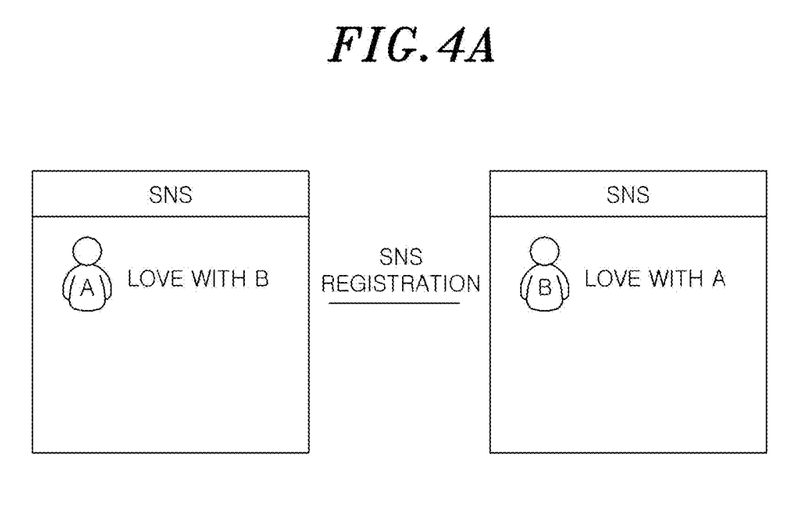
FIGS. 4A-4D are diagrams showing an embodiment in which an SNS-based file aging service illustrated in FIG. 1 in is embodied on SNS.
Figure 4B:
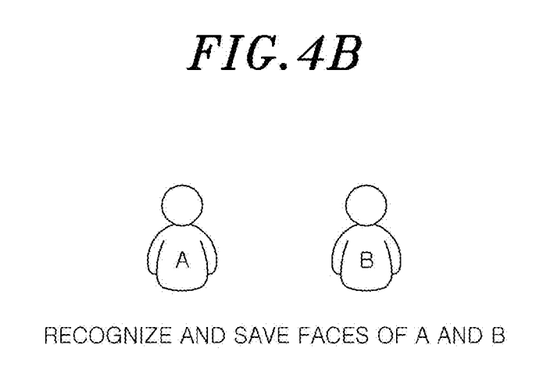
Figure 4C:
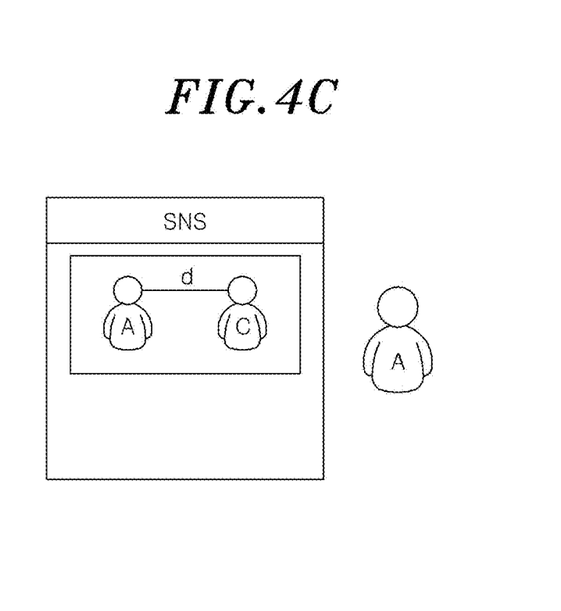
Figure 4D:
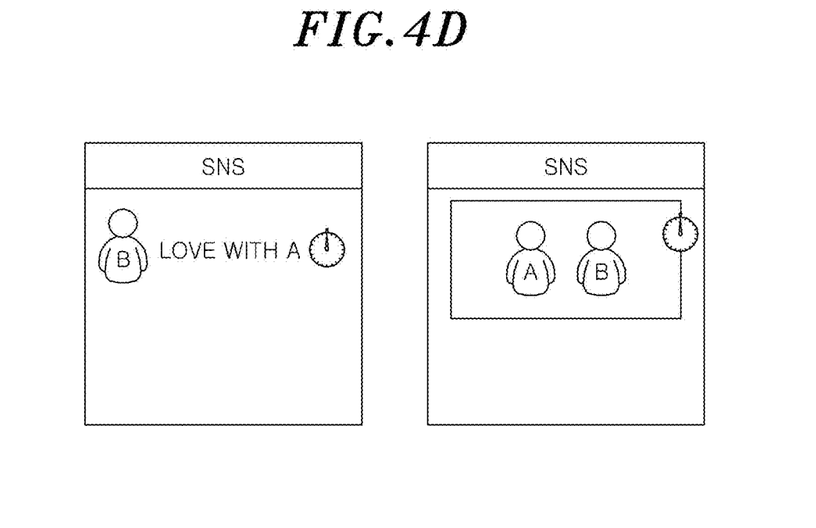
Figure 5A:
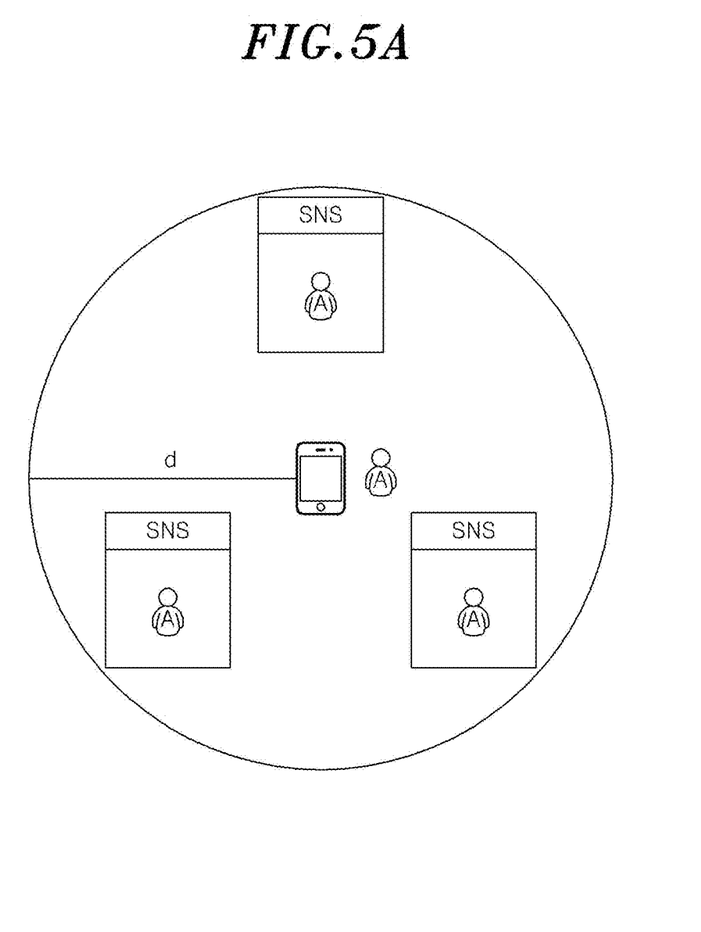
FIGS. 5A-5C are diagrams showing an embodiment in which an SNS-based file aging service illustrated in FIG. 1 is embodied on SNS.
Figure 5B:
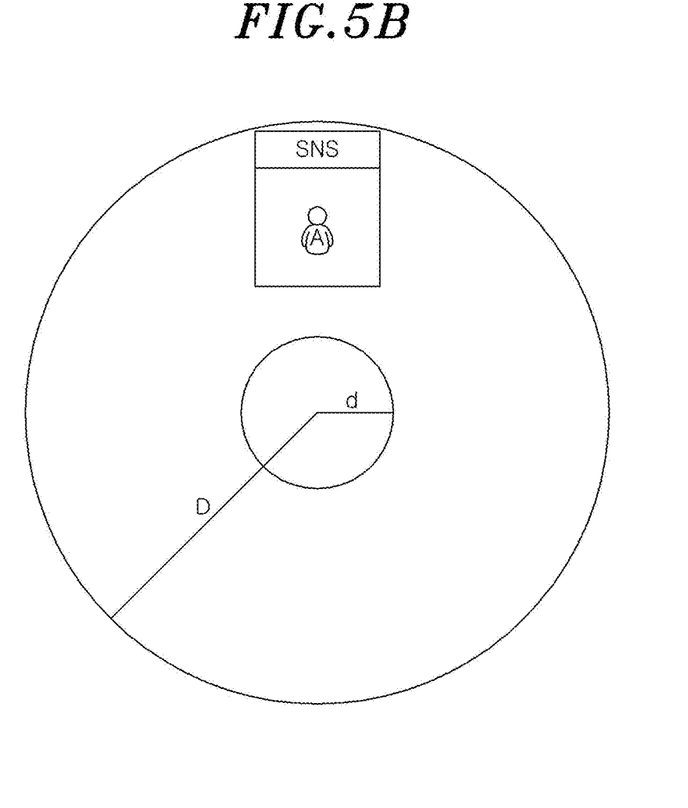
Figure 5C:
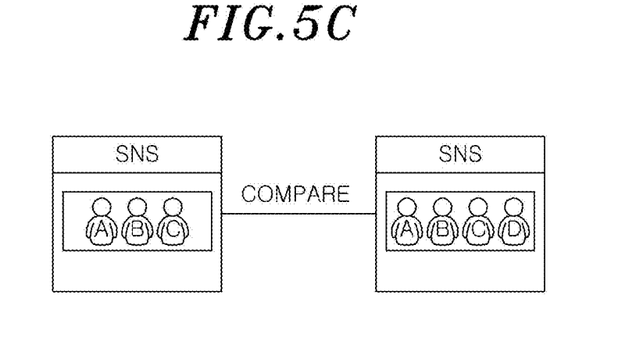

FIG. 1 is a diagram of a configuration for explaining a system of providing an SNS-based file aging service in accordance with an embodiment of the present invention; FIG. 2 is a diagram illustrating a configuration for a SNS-based file aging service providing server shown in FIG. 1; FIG. 3 is a diagram showing an embodiment in which an SNS-based file aging service illustrated in FIG. 1 is embodied on an SNS; FIG. 4 is a diagram showing an embodiment in which an SNS-based file aging service illustrated in FIG. 1 in FIG. 1 is embodied on an SNS; and FIG. 5 is a diagram showing an embodiment in which an SNS-based file aging service illustrated in FIG. 1 is embodied on SNS. Hereinafter, in accordance with an embodiment of the present invention, at least one user and at least one user terminal are defined as the same term, and an SNS server and at least one SNS server are defined as the same term.

With reference to FIG. 2, the SNS-based file aging service providing server 300 may include a receiving unit 310, an identifying unit 320, a storage unit 330, an extinction unit 340, a state changing unit 350, a memory managing unit 360, an anti-aging unit 370, and an aging management unit 380.

In accordance with an embodiment of the present invention, the SNS-based file aging service providing server 300 or other server (not shown) operated by interworking with the file aging service providing server 300 may transmit a file aging service application, a program, a web page, and so on to at least one user terminal 100 or at least one SNS server 400. In response thereto, at least one user terminal 100 or at least one SNS server 400 may install or open the application, the program, the webpage, and so on about the relevant service. Further, the file aging service program may be run by using a script executed on a web browser on at least one user terminal 100 or at least one SNS server 400. Herein, the web browser is a program capable of using a web (WWW: World Wide Web) service and means a program that receives and shows a hypertext programmed with HTML (Hyper Text Mark-up Language). The web browser may include Netscape, Explorer, Chrome, and so on, for example. Further, the application means an application program on the terminal, for example, including an app executed on a mobile terminal (e.g., a smartphone). The app may be installed on the mobile terminal by downloading it from a mobile application market, which is a virtual market where mobile content are freely traded.

In this case, the connection to the network 200 means an interconnection among the user device 100, the user's need identifying server 300, and the at least one server 400 so that they can be in communication with one another. In addition, the establishment of the connection to the network 200 means that the SNS-based file aging service providing server 300 generates a communication entity at the communication contact point for communicating with a terminal that is connected to the network 200. The file aging service providing server 300 may exchange with the terminal each other through the communication entity.

The receiving unit 310 may receive an SNS registration event for at least one user. For example, the SNS registration event may be an event that a first user registers a second user as a friend, or may be an event that the second user accepts a friend request of the first user. Also, the SNS registration event may be an event that becomes friends between at least one user and another user or includes a love or marriage news in a state message for at least one user. For example, it may be a message showing that the first user and the second user are dating now or the first user is married with the second user, which message may be displayed on the profiles of the first user and the second user. And, in case where at least one user includes the first user and the second user and the SNS registration event is a message that they are courting or they are married as included in the state message for at least one user, the receiving unit 310 may recognize faces of the first user and the second user and then stores them by mapping them with the first user and the second user. Further, when the first user or the second user uploads an image or video having a distance under a predetermined distance with the opposite sex except for the second user or the first user beyond a predetermined number of times, period or number, the receiving unit 310 may process content including the second user or the first user of the first user or the second user to be aged on the SNS of the first user or the second user and then change the date state message or marriage state message included in the state message for at least one user. In other words, even though a courting or married between both parties is written, provided that a picture with the opposite sex is many or frequently uploaded, the opposite sex makes many comments on SNS of the relevant user, or the relevant user has a lot of physical contact with the opposite sex or does a specific action such as a hugging or a kissing, it may determine that a fidelity to a courting or married is low, and thus it may process the comments, image, and the like for the opposite party to be aged. And, the specific action may be recognized by using a predetermined image template representing the specific action. Merely, the receiving unit 310 may collect and store images of famous persons including an entertainer through a web crawler. In case where an image of the opposite sex is an image of the famous person, an aging process may not be done. In other words, it is because that it is unusual to take a picture with a famous entertainer in physically contacting state.

The identifying unit 320 may identify whether the content upload event is being occurred on SNS of at least one user which receives the SNS registration event. In other words, after making a friend, the identifying unit 320 may identify whether the content of the user who becomes the friend is uploaded from at least one user terminal 100 on SNS of at least one user. Herein, at least one user may include a first user and a second user, and the content at which the content upload event is occurred may include a content uploaded on SNS of the first user, which is made by the first user with respect to the second user or a content uploaded on SNS of the second user, which is made by the second user with respect to the first user. Herein, the content at which the content upload event is occurred may include at least one among a state representing message about a text, a comment, an image, a video and content. Further, the content upload event may include an identification number of at least one user terminal 100, ID or password information of at least one user terminal 100, URL information having the uploaded content that are posted, and content extinction time information at which the uploaded content is expired, all of which are represented as meta information. In this case, ID or password information of at least one user terminal 100 includes ID or password of the site having the content that is posted, and also includes ID or password of the site provided by the SNS-based file aging service providing server 300. To distinguish them, tag or Meta information is tagged on the ID or password to identify which site or application is related to the ID or password.

The storage unit 330 may map and store the content at which the content upload event is occurred with the SNS registration event of at least one user.

In case where there occurs the SNS registration event for at least one user from at least one user, the extinction unit 340 may extinct the content uploaded on SNS, which is stored by mapping with the SNS registration event. Further, the extinction unit 340 may transform the content by outputting an aging signal of content based on the time difference between the time when the SNS registration event is occurred and the time when the SNS deregistration event is occurred. Further, the extinction unit 340 may transmit an extinction scheduling message of content to at least one terminal 100 within a predetermined period of time from the content extinction time. At least one SNS server 400, which is a server of SNS, may transform the content to be corresponded to the aging signal. At least one user may be a first user and a second user, and the SNS deregistration event may include a friend deleting event or a friend blocking event. For example, in case where the SNS deregistration event is the friend deleting event that the first user want to end the relationship with the second user, the extinction unit 340 may process the content of the second user uploaded on SNS of the first user to be aged. In case where the SNS deregistration event is the friend blocking event that the first user want to be done with the second user, the extinction unit 340 may process the content of the second user uploaded on SNS of the first user to be deleted. In case where the SNS deregistration event is received from the first user and the second user, the extinction unit 340 may process the content of the second user uploaded on SNS of the first user and the content of the first user uploaded on SNS of the second user to be deleted. In other words, usually the case that the user wants to delete it from SNS is a case that privacy is invaded and a couple is separated. In case of the later, when one side is unilaterally blocked, the other side who wants to delete comments or pictures of their own uploaded on the SNS of the one side usually is not able to visit (check) the one side. Accordingly, an aging processing may be executed by a case that one side is unilaterally blocked, or a case that one side is unilaterally deleted from the list of friends, or a case that both parties is blocked or deleted.

Furthermore, the extinction unit 340 may receive an ID and password of the SNS server 400 related to at least one user terminal 100 via the server 400 of SNS from at least one user terminal 100, or receive an ID and password of at least one user terminal 100 from the server 400 of SNS. And, the extinction unit 340 may store the received ID and password by mapping them with at least one user terminal 100 and the server 400 of SNS to which the ID and password is applied, and may receive a response message of the extinction scheduling message of content from at least one user terminal 100. Further, the extinction unit 340 may output the de-aging signal when the response message is the content extinction curing message, and output a content extinction signal when the response message is the content extinction identifying message. Further, the extinction unit 340 may search a site provided by the SNS server 400 by using an image recognition algorithm and find a user interface used to input ID and password, and may input the received ID and password into the found user interface using to input the ID and password. Further, the extinction unit 340 may recover an extinction state of the content uploaded by at least one user terminal 100 by de-aging the content, or may automatically extinct the content uploaded by at least one user terminal 100. Herein, to search the user interface, the extinction unit 340 may extracts a coordinate value of the user interface used for inputting ID and password at the site provided by the server 400 of SNS, and may be realized by adjusting the coordinate value corresponding a screen size and a screen magnification of at least one user terminal 100. Herein, when the content are uploaded by at least one user terminal 100, the server 400 of SNS may provide a timer capable of setting a time of content extinction and its corresponding user interface to at least one user terminal 100.

The state changing unit 350 may recognize and store a face of a first user and a second user, before receiving an SNS registration event that at least one user registers at least one another user, when the content of the second user or the first user are uploaded on SNS of the first or the second user related to at least one user. Further, the state changing unit 350 may measure a distance between the first user and the second user if both of the first user and the second are included in the content uploaded on SNS of the first user or the second user. When the distance as measured above is under a predetermined distance and when the content matches a predetermined image template, the state changing unit 350 may change a state message of the first user and the second user into a message that they are courting or they are married. In other words, even though a state of both parties is not intentionally changed, the content containing the expression of affection of both parties are frequently or may uploaded. In this case, therefore, in order to protect that a relationship with the opposite sex is being closed, the state message of both parties may be changed automatically.

The memory managing unit 360 may store an attribute of content uploaded on SNS of at least one user by mapping it with that content. Further, the memory managing unit 360 may grasp a range of activity of at least one user based on GPS (Global Positioning System) among the attributes of content. For example, provided that 'A' user mainly uploads the content containing GPS coordinate of Seoul or Incheon, it may be recognized that an office or house of 'A' user is in Seoul or Incheon. In this case, provided that 'A' user uploads the content containing GPS coordinate besides Seoul or Incheon, it may regarded that 'A' user took a trip or the content include a special reminiscence. Accordingly, it may process an anti-aging except for aging be processed. In other words, in case where the attribute of the content uploaded on the SNS exceeds a predetermined range more than the range of activity of at least one user, the memory managing unit 360 may output an anti-aging signal. However, even though the content include photos that were taken in traveling sites, if photos having a bad resolution and photos having a good resolution are mixed each other, the memory managing unit 360 may delete the rest of photos except for some photos having a good resolution. In other words, the memory managing unit 360 may output an aging signal about content if an index of similarity between frames included in the content obtained through an image analysis of content exceeds a predetermined similarity, or a resolution of content are under a predetermined resolution. However, the memory managing unit 360 may output an anti-aging signal if the number of people included in frames is different from each other even though an index of similarity between the frames included in the content obtained through an image analysis of content exceeds a predetermined similarity. Further, in case where the second user is included in the content uploaded on SNS of the first user, the memory managing unit 360 may control to output the content uploaded on SNS of the first user to an updated message of the second user. For example, provided that 'A' user uploads photos including both of 'A' and 'B' on SNS of 'A', and the posted photos do not receive attention from other people, the relevant photos may not be seen in the updating history for SNS of 'B'. In this case, even though the posted photos do not receive attention, the memory managing unit 360 may notify the content including 'B' to 'B'.

After becoming extinction the content uploaded on the SNS, which is stored by mapping it with the SNS registration event, the anti-aging unit 370 may yield a time difference between the SNS registration event time and the SNS deregistration event time, and may transmit a message asking whether or not an anti-aging should be performed on the expired content to at least one user terminal 100 at the time after the yielded time difference from the SNS deregistration event time. Herein, the message may be transmitted through e-mail, SMS, MMS or SNS. For example, when a couple is separated, since both parties do not want to see their photos in their SNS for the present, content are deleted by them. But as time passed, since the farewell may be good memories, after passing the relevant time, a message that asks whether the relevant content are needed to be recovered may be transmitted to at least one user terminal 100. For example, the message may include a sentence "a rainy today, do you want to see photos of XXX?". And, after checking weather according to GPS, date and time of the expired content, if the weather is similar to current weather, the anti-aging unit 370 may transmit a message regarding whether the relevant anti-aging needs to be performed. In other words, a necessary condition is that the yielded time difference must be passed from the SNS deregistration event time, and a sufficient condition may be set to be a case that the weather or GPS coordinate is the same. In other words, the anti-aging unit 370 may search a weather of a date, time, and GPS coordinate that the expired content was taken based on the date, time, and GPS coordinate of the expired content.

If the searched weather or GPS coordinate is in a predetermined error range, it may be the sufficient condition.

The aging managing unit 380 may receive a response message of the extinction scheduling message of content from at least one user terminal 100. If the response message is the content extinction curing message, the aging managing unit 380 may output the de-aging signal of content, and if the response message is the content extinction identifying message, it may output the extinction signal of content to the server 400 of SNS so that the content are deleted. The de-aging signal of content may be a content extinction time changing signal that extends the content extinction time, a content storing signal that stores the content in at least one user terminal 100 or at least one SNS server 400, or a content extinction time reset signal that resets the content extinction time. The aging signal of content is transmitted to at least one site and at least one SNS server 400, and the aging signal of content may be a signal that adjusts the content or at least one of a fading, a scratch, a noise, and a transparency of a user interface displaying the content. And, the aging signal of content may be a signal outputting the aging signal of content based on the time difference between the content extinction time and a current time. Herein, a transformation rate of content may correspond to the time difference between the content extinction time and a current time. Further, the transformation rate of content may correspond to the time difference between the SNS registration event time and the SNS deregistration event time. And, the aging managing unit 380 may receive a search event for the content uploaded by at least one user terminal 100 from at least one SNS server 400, and change an extinction time of content based on the received search event. In this case, the more the number of searches included in the search event, the slower the extinction time of content, and the less the number of searches included in the search event, the faster an extinction time of content. In other words, in case where the content is not worth, an aging of content may be accelerated; therefore, the database may be efficiently used.

Furthermore, when at least one user uploads the content on the SNS of at least one user, and designates a user who is able to check the uploaded content, the aging extinction time of previously uploaded content may be increased or decreased based on a checking times, period or frequency of the designated user. The SNS-based file aging service providing server 300 may be set to check the uploaded content through a password. And, if the user who is able to check uploaded content is designated, the SNS-based file aging service providing server 300 generates a password and transmits it to a terminal of the user who is able to check uploaded content. Subsequently, if the transmitted password matches the password received from the user who is able to check uploaded content, the SNS-based file aging service providing server 300 may allow the user to check the uploaded content. Otherwise, the password may be received from at least one user.

An operation of the above described SNS-based file aging service providing server 300 will be described with reference to FIG. 3 to FIG. 5. With reference to FIG. 3, it is supposed that (a) A and B were registered as a friend each other, (b) A uploaded photos of B on his/her SNS, and B commented on this. In this case, if (c) A and B cancel the friend registration each other, (d) comments of B may be aged or immediately deleted. Further, with reference to FIG. 4, if (a) A and B change their state message into a courting couple, (b) a face image of A and B is recognized and stored. In this case, if an image of distance (d) close to the opposite sex C instead of A and B is frequently or many uploaded, (e) a state message of SNS of B and uploaded photos of A and B may be aged or immediately deleted. And, with reference to FIG. 5, (a) an action radius of A is checked based on content uploaded by A, (b) if content on SNS uploaded by A is out of the action radius, the relevant content are not aged, (c) even though a frame similarity rate is content over a predetermined value, aging processing may not be done if the relevant numbers are different.

Figure 6A:
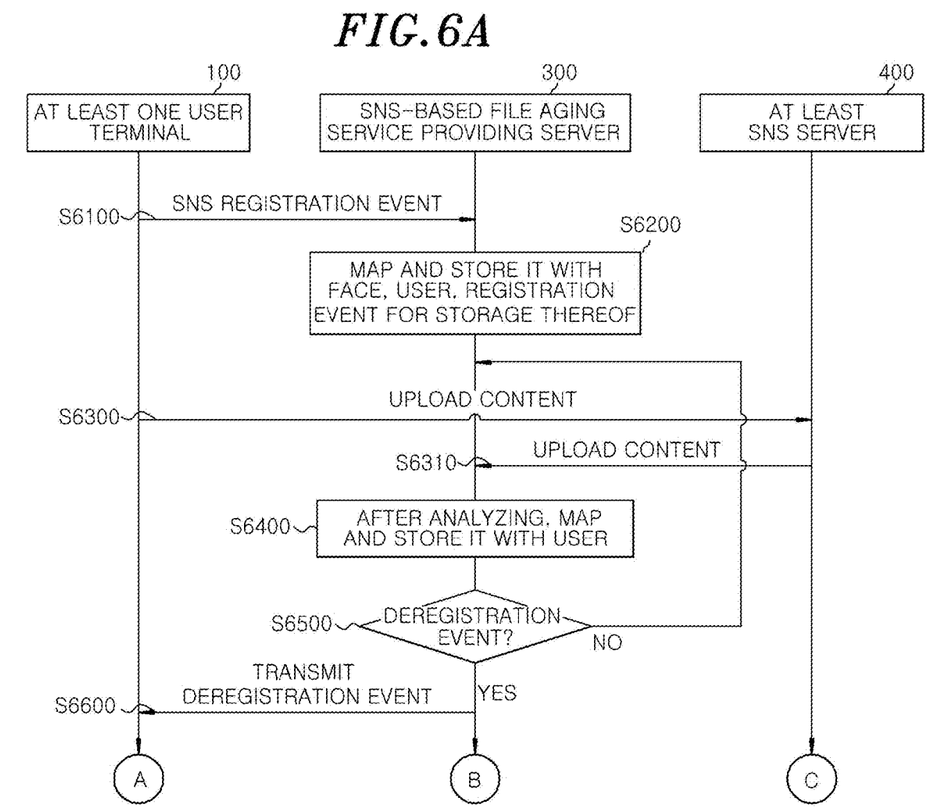
FIGS. 6A and 6B are diagrams showing a process of transmitting or receiving data between each component included in the system of providing an SNS-based file aging service shown in FIG. 1 in accordance with an embodiment of the present invention.
Figure 6B:
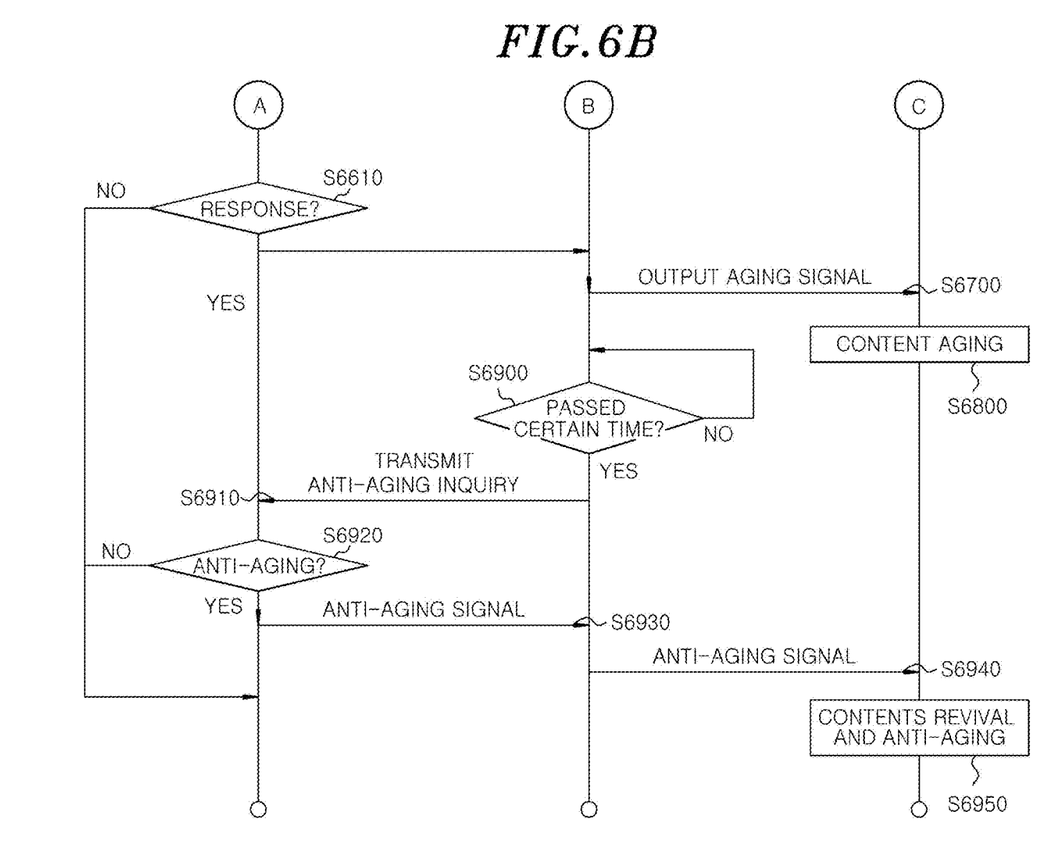

FIG. 6 is a diagram showing a process of transmitting or receiving data between each component included in the system of providing an SNS-based file aging service shown in FIG. 1 in accordance with an embodiment of the present invention. Hereinafter, an example of the process that transmits and receives signals will be described with reference to FIG. 6, however, the present disclosure is not limited to such an embodiment and it will be appreciated by those skilled person in the art that the process to transmit and receive the signals as shown in FIG. 6 may be changed with various embodiments as set forth above.

Referring to FIG. 6, an SNS registration event may be transmitted from at least one user terminal 100 to the SNS-based file aging service providing server 300 (S6100). The SNS-based file aging service providing server 300 may then store a face of the user, the user, and a registration event by mapping them (S6200). Next, if content are uploaded to at least one SNS server 400 from at least one user terminal 100 (S6300), it may be received by the SNS-based file aging service providing server 300 (S6310).

And then, by the SNS-based file aging service providing server 300, the content is analyzed and stored through mapping it with a user (S6400), and then whether a deregistration event is being occurred is monitored (S6500).

If the deregistration event is being occurred, an SNS deregistration event is transmitted from the SNS-based file aging service providing server 300 transmits to at least one user terminal 100 (S6600). Thereafter, if a response exists (S6610), an aging signal is outputted from the SNS-based file aging service providing server 300 to at least one SNS server 400 (S6700). Therefore, a content aging may be occurred in at least one SNS server 400 (S6800).

Next, the SNS-based file aging service providing server 300 checks whether a certain time is passed (S6900). As a check result, if the certain time is passed, an inquiry of the anti-aging is transmitted to at least one user terminal 100 (S6910). In response, if the anti-aging is agreed by at least one user terminal 100 (S6920), an anti-aging signal is relayed to the SNS-based file aging service providing server 300 (S6930), and is then transmitted from the SNS-based file aging service providing server 300 to at least one SNS server 400. Consequently, whereby at least one SNS server 400 may revive the content and perform the anti-aging on the content.

The order of the above operations described in operation S6100 to S6950 is merely an example and the embodiment is not limited thereto. In other words, the order of the operations described in operations S6100 to S6950 may be mutually exchanged, and some of those operations may be simultaneously executed or partially removed.

Those not described in the method for providing an SNS-based file aging service shown FIG. 6 is identical to or may be easily inferred from those of the method for providing an SNS-based file aging service described with reference to FIGS. 1 to 5, and, therefore, a further description of the method therefor will be omitted.

Figure 7:
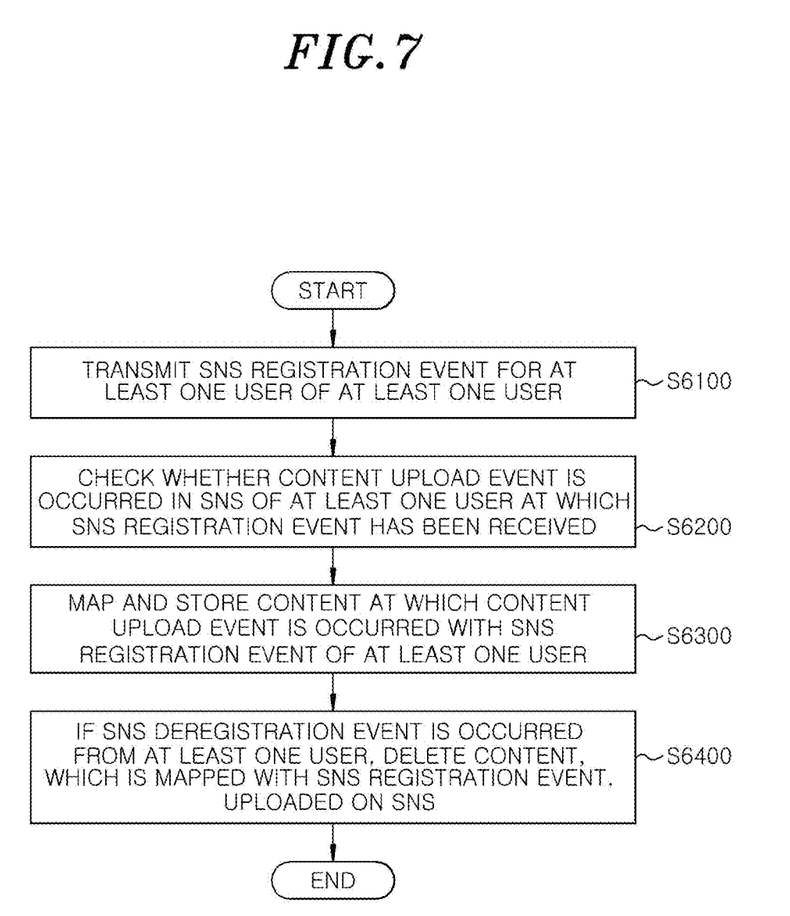
FIG. 7 is a flowchart explaining a method of providing an SNS-based file aging service in accordance with an embodiment of the present invention.

FIG. 7 is a flowchart explaining a method of providing an SNS-based file aging service in accordance with an embodiment of the present invention. With reference to FIG. 7, an SNS registration event for at least one user is received by the SNS-based file aging service providing server (S7100).

Next, it is checked by the SNS-based file aging service providing server whether a content upload event is being occurred on the SNS of at least one user at which an SNS registration event has been received (S7200).

Thereafter, by SNS-based file aging service providing server, the content at which the content upload event has been carried out by mapping it with the SNS registration event of at least one user (S7300). If the SNS deregistration event for at least one user from at least one user is being occurred, the SNS-based file aging service providing server deletes content uploaded on the SNS that is stored by mapping it with SNS registration event (S7400).

Those not described in the method for providing an SNS-based file aging service shown FIG. 7 is identical to or may be easily inferred from those of the method for providing an SNS-based file aging service described with reference to FIGS. 1 to 6, and, therefore, a further description of the method therefor will be omitted.

The method for providing an SNS-based file aging service of the embodiment described in FIG. 7 may be implemented in the form of recording media including instructions executable by a computer, such as applications or program modules that are executed by a computer. The computer readable media may be any available media that can be accessed by a computer and may include volatile and nonvolatile media, and removable and non-removable media. Further, the computer readable media may include any computer storage media and communication media.

The computer storage media may include any volatile and nonvolatile media and removable and non-removable storage media that are implemented in any methods or technologies for the storage of information such as data and computer-readable instructions, data structures, program modules, or other data. The communication media may include a transport mechanism or any information delivery media for transmitting computer readable instructions, data structures, program modules or other data of modulated data signal such as carrier waves.

The method for providing an SNS-based file aging service of the embodiment described above may be executed by the applications installed on the terminal by default (which may be programs included in the platform or operating system that are mounted on the terminal by default) or may be executed by applications (i.e., the programs) that are installed directly on the terminal by the user through an application storing server or an application providing server such as a Web server associated with the applications or related services. In this sense, the method for providing an SNS-based file aging service in accordance with the embodiment of the present invention may be recorded on a computer-readable recording medium that may be implemented with the applications (i.e., the programs) that are mounted on the terminal by default or installed directly on the terminal by the user.

Description of the present invention as mentioned above is intended for illustrative purposes, and it will be understood to those having ordinary skill in the art that this invention can be easily modified into other specific forms without changing the technical idea and the essential characteristics of the present invention. Accordingly, it should be understood that the embodiments described above are exemplary in all respects and not limited thereto. For example, respective components described to be one body may be implemented separately from one another, and likewise components described separately from one another may be implemented in an integrated type.

What is claimed is:

1. A method for providing an SNS-based file aging service executed in a SNS-based file aging service providing server for at least one user including a first user and a second user, the method comprising:
   receiving a SNS registration event for the first user of the second user;
   checking whether a content upload event is being occurred on a SNS of the first user or the second user at which the SNS registration event is received;
   mapping the content at which the content upload event is occurred with the SNS registration event of the first user or the second user for the storage thereof; and
   expiring the content uploaded on the SNS, the content being stored by mapping it with the SNS registration event, when the first user requests an SNS deregistration event for the second user or when the second user requests the SNS deregistration event for the first user,
   wherein when the first user, or the second user, uploads the content on the SNS of the second user, or the first user, and if a user who is able to check the uploaded content is designated, an aging extinction time of previously uploaded content based on a checking times, period or frequency of the designated user is increased or decreased.

2. The method of claim 1, wherein said expiring the content comprises,
   transforming the content by outputting an aging signal of the content based on a time difference between the time when the SNS registration event is being occurred and the time when the SNS deregistration event is being occurred; and
   transmitting an extinction scheduling message of the content to at least one user terminal within a predetermined time from the content extinction time,
   wherein at least one SNS server of the SNS transforms the content to be corresponded to the outputted aging signal.

3. The method of claim 2, wherein the transformation rate of content corresponds to the time difference between the SNS registration event time and the SNS deregistration event time.

4. The method of claim 1, wherein the SNS registration event is an event that comprises an event of making a friend between the first user and the second user or an event of showing a love or marriage news in a state message of the first user or the second user.

5. The method of claim 1, wherein the content at which the content upload event has been carried out includes content uploaded on the first user's SNS about the second user or content uploaded on the second user's SNS about the second user.

6. The method of claim 1, wherein the content related to the content upload event include a state expression message about any one of a text, a comment, an image, a video and content.

7. The method of claim 1,
   wherein the SNS deregistration event includes a friend deleting event or a friend blocking event,
   if the SNS deregistration event is the friend deleting event for the second user of the first user, aging the content of the second user uploaded on the SNS of the first user,
   if the SNS deregistration event is the friend blocking event for the second user of the first user, deleting the content of the second user uploaded on the SNS of the first user,
if the SNS deregistration event is received from the first user and the second user, deleting the content of the second user uploaded on the SNS of the first user and the content of the first user uploaded on the SNS of the second user.

8. The method of claim 1,
if the SNS registration event is a dating state message or a marriage state message included in a state message of the first user or the second user, faces of the first user and the second user are recognized and the recognized faces are mapped with the first user and the second user for the storage thereof,
if the first user or the second user uploads an image or a video having a distance under a predetermined distance with a person of the opposite sex except for the second user or the first user to exceed a predetermined number, period or times, the content including the second user of the first user, or the first user of the second user, is processed to be aged from SNS of the first user or the second user, and
the dating state message or the marriage state message included in the state message of the first user or the second user is changed.

9. The method of claim 8, wherein an image of a famous person including an entertainer is collected through a web crawler and is stored, and
if the image of the person of the opposite sex is the image of the famous person, the aging process is not performed on the image.

10. The method of claim 1, further comprising:
before receiving the SNS registration event for the first user of the second user, or for the second user of the first user,
if the content of the second user and the first user are uploaded on the SNS of the first user or the second user, recognizing and storing faces of the first user and the second user;
if both of the first user and the second user are included in the content uploaded on SNS of the first user or the second user, measuring a distance between the first user and the second user; and
if the measured distance is under a predetermined distance, and the content match a predetermined image template, changing a state message of the first user and the second user into a dating state message or a marriage state message.

11. The method of claim 1, further comprising:
mapping an attribute of the content uploaded on the SNS of the first user or the second user with the content for the storage thereof;
checking a range of activity of the first user or the second user based on GPS among the attribute of the content;
if the attribute of the content uploaded on the SNS of the first user or the second user exceeds by a predetermined range than the checked range of activity of the first user or the second user, outputting an anti-aging signal to the content.

12. The method of claim 11, wherein said outputting the anti-aging signal to the content comprising:
if an index of similarity between one frame and an other frame included in the content obtained through an image analysis of the content exceeds a predetermined similarity, or if a resolution of the content is under a predetermined resolution, outputting the aging signal about the content.

13. The method of claim 11, wherein said outputting the anti-aging signal to the content comprising:
if the index of similarity between one frame and an other frame included in the content obtained through an image analysis of the content exceed a predetermined similarity, but the number of people included in the one frame is different from the number of people included in the other frame, outputting an anti-aging signal about the content.

14. The method of claim 1,
wherein if the second user is included in content uploaded on the SNS of the first user, controlling the output of the content uploaded on the SNS of the first user to an updated message of the second user.

15. The method of claim 1, further comprising:
after expiring the content uploaded on the SNS, the content being mapped with the SNS registration event,
yielding a time difference between the SNS registration event time and the SNS deregistration event time;
transmitting a message asking whether an anti-aging needs to be performed for the expired content to at least one user terminal at the time after the yielded time difference from the SNS deregistration event time, and
wherein the message is transmitted through e-mail, SMS, MMS or SNS, and a necessary condition is that the yielded time difference must be passed from SNS deregistration event time.

16. The method of claim 1, wherein if the first user requests the SNS deregistration event for the second user or if the second user requests the SNS deregistration event for the first user, said deleting the content uploaded on the SNS, the content being mapped with the SNS registration event, comprising:
receiving ID and password for a server of the SNS of at least one user terminal via the server of the SNS from the at least one user terminal, or receiving ID and password of the at least one user terminal from the server of the SNS;
mapping the received ID and password with the at least one user terminal and the server of the SNS to which ID and password is applied for the storage thereof;
receiving a response message of an extinction scheduling message of the content from the at least one user terminal;
outputting an de-aging signal of the content if the response message is the content extinction curing message, and outputting an extinction signal of the content if the response message is the content extinction identifying message;
searching a user interface inputting the ID and password by using an image recognition algorithm in the server of the SNS;
inputting the received ID and password into the user interface inputting the searched ID and password; and
recovering an extinction state by de-aging the content uploaded by the at least one user terminal, or automatically making the content uploaded by the at least one user terminal become extinct.

17. The method of claim 16, wherein said searching the user interface comprises:
extracting a coordinate value of the user interface inputting the ID and password from a site provided by the server of the SNS; and adjusting the coordinate value corresponding to a screen size and a screen magnification of the at least one user terminal to execute the user interface.

18. The method of claim 1, wherein when the first user, or the second user, uploads the content on SNS of the second user, or the first user, while designating a user who is able to check the uploaded content, the uploaded content is checked through a password.

19. The method of claim 1, wherein if the first user or the second user who is able to check the uploaded content is designated, the SNS-based file aging service providing server generates a password and transmits it to a terminal of the first user or the second user who is able to the check uploaded content, and allows the first user or the second user who is able to check the uploaded content to check the uploaded content if the transmitted password matches the password received from the second user or the first user.

* * * * *